UNITED STATES PATENT OFFICE.

HENDERSON W. BUTTLES, OF NEW YORK, N. Y.

IMPROVEMENT IN PROCESSES OF PREPARING AND PRESERVING CLAMS.

Specification forming part of Letters Patent No. 191,024, dated May 22, 1877; application filed March 2, 1877.

*To all whom it may concern:*

Be it known that I, HENDERSON WARD BUTTLES, of the city, county, and State of New York, have invented a new and useful Preparation of Desiccated Clams, the nature of which is fully set forth in the following specification:

My invention relates to the preparation and preservation of clams, or other shell-fish of the same order, as an article of food; and it consists in the process of preparing the clams by reducing the flesh or meat, in the juice thereof, to a pulpy mass of uniform consistency, by any suitable means which shall serve to grind, grate, crush, or otherwise comminute the same into very fine particles, and then desiccating this pulpy mass, either by submitting it to a moderate heat *in vacuo* or under the influence of currents of heated air, or otherwise by placing it under such condition as shall most rapidly operate to produce an evaporation of the water therefrom without cooking or coagulating its albuminous particles.

I purpose combining the pulp with a suitable proportion of salt and of some simple alimentary farinaceous substance derived from cereals or from roots, either before or after its desiccation.

The desiccated compound is prepared for use by pulverization.

The object of my invention is to furnish, as an article of commerce, and for the purposes of food, a nutritious preparation of shell-fish in a condensed form, which will remain fresh, sweet, and pure for many years with ordinary care and protection from moisture.

In preparing the clams for desiccation according to my process, the meat is reduced to a pulp in its own juice by passing the meat and juice of the freshly-opened clams through a mill constructed on the principle of the "beating-engine" used by paper-makers in the preparation of paper-pulp from rags, the clam meat, flowing in its juices, being caused to pass between a revolving cylinder armed with knives arranged parallel to its axis, and stationary knives fixed below it, the two sets of knives being so approximated as to readily cut that which passes between them, the pulp being made to circulate in a suitable channel from the knives back again to the opposite side thereof, by means of the revolution of the cutting-cylinder. Or the clams may be crushed and thus reduced to pulp by means of a wheel revolving in a circular trough, or by means of any of the improved forms of meat-chopping machines known to the art.

Having reduced the clam meat to a pulp in its own juice by any suitable means, substantially as described, it is next desiccated, either by subjecting it to strong currents of moderately-heated air upon revolving cylinders or disks, as in the processes for desiccating eggs patented by Lamont, Quick, and others, or by exposing it to a moderate heat in suitable vessels placed in a receiver wherein a vacuum more or less perfect has been produced. In either case the clam pulp must not be subjected to a temperature so high as that the albumen in the pulp shall be cooked or in the least coagulated and hardened while desiccating.

The clam meat thus desiccated in its own juices, is prepared for market and use by reducing the resultant hard brittle mass to an impalpable powder, and then admixing it with common salt finely powdered, and with a proper proportion of pure and unadulterated cooked or uncooked pulverent farinaceous substance, derived either from cereals— such as wheat-flour, or from roots, such as potato-starch—a proportion of about sixty per cent. of clam, thirty-two per cent. of farinaceous material, and eight per cent. of salt, yielding an excellent product. Or the clam pulp, prepared substantially as above described, may be admixed with bread-crumbs, cracker-dust, or other farinaceous preparation before desiccation in sufficient proportion to form a paste or dough, and the resulant hard dry compound be reduced to a powder for use.

I claim as my invention—

The process of preparing and preserving clams by reducing them when fresh to a pulp in their own liquor, and desiccating the product, substantially as and for the purpose herein set forth.

In testimony whereof I have hereunto set my hand this 26th day of February, A. D. 1877.

HENDERSON W. BUTTLES.

In presence of—
M. D. BUTTLES,
SAML. KREIZER.